United States Patent [19]
Siu-Man

[11] Patent Number: 6,037,078
[45] Date of Patent: Mar. 14, 2000

[54] BATTERY COMPARTMENT

[75] Inventor: Nan Siu-Man, Hong Kong, China

[73] Assignee: Nanma Manufacturing Company Limited, Hong Kong, China

[21] Appl. No.: 08/982,170

[22] Filed: Dec. 1, 1997

[30] Foreign Application Priority Data

Feb. 21, 1997 [GB] United Kingdom .................... 9703661

[51] Int. Cl.$^7$ ...................................... H01M 2/02

[52] U.S. Cl. .............................. 429/96; 429/98; 429/100; 429/97; 601/70; 601/63

[58] Field of Search ................................ 429/96, 98, 99, 429/100, 97; 601/70, 63, 115, 160

[56] References Cited

FOREIGN PATENT DOCUMENTS 1522674  8/1978  United Kingdom .
2 253 512  9/1992  United Kingdom .

*Primary Examiner*—Maria Nuzzolillo
*Assistant Examiner*—Angela J. Martin
*Attorney, Agent, or Firm*—Young & Thompson

[57] ABSTRACT

A battery compartment (10) associated with a battery-powered electrical device, the compartment (10) including control elements (12) for varying the electrical power delivered to the device; the control elements include a rotatable member (12), a water-proofing washer member (33) located within the control elements (12) and between the rotatable member and a battery contact member (26, 28) so that the operation of the associated electrical device can be controlled while the washer member serves to achieve the required level of water-proofing.

17 Claims, 2 Drawing Sheets

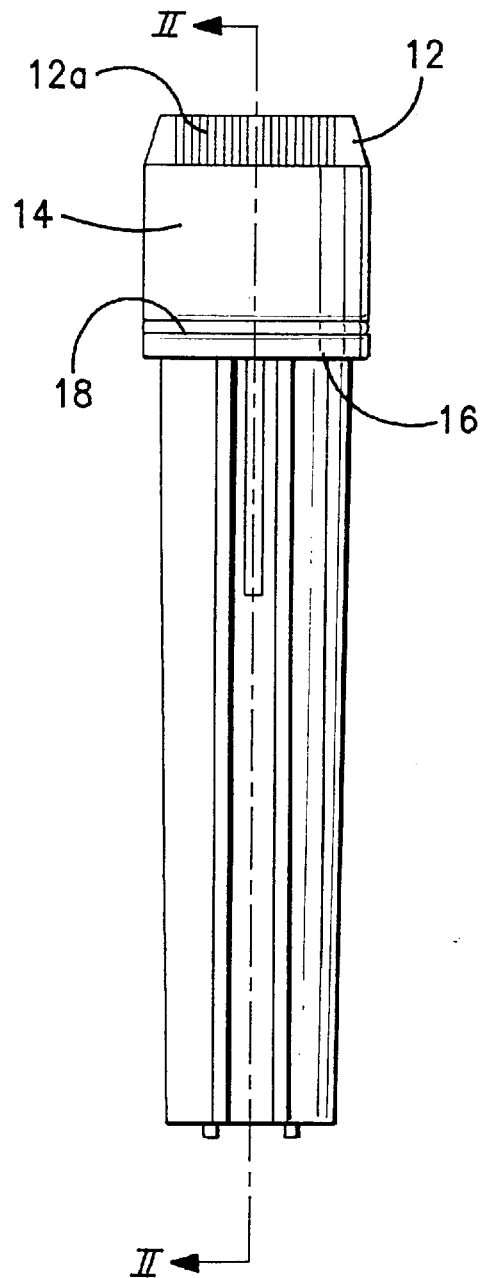
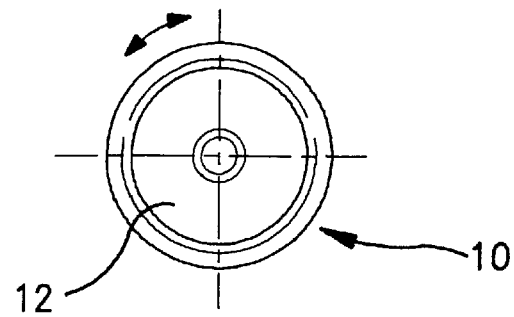
FIG. 1B
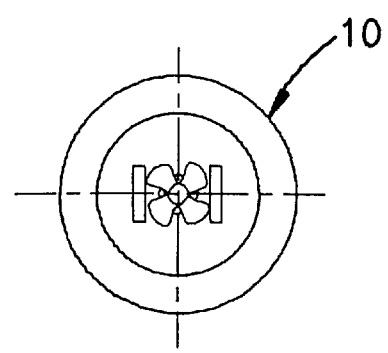
FIG. 1A
FIG. 1C

BATTERY COMPARTMENT

BACKGROUND OF THE INVENTION

The present invention relates to a battery compartment associated with a battery-powered electrical device and, in particular, into a vibratory and/or massaging electrical device.

DESCRIPTION OF THE RELATED ART

Electrical devices, in particular hand-held electrical devices, commonly derive their power by way of one or more batteries which are housed within a compartment associated with the electrical device. The aforementioned compartment can be provided integrally with the electrical device or alternatively can be provided remote from the electrical device but connected thereto by conductor means such as electrical wires.

By their very nature, hand-held electrical devices are quite often designed to be readily portable and readily used in a variety of environmental circumstances some of which may include situations in which a liquid, for example water, might come into contact with the electrical device and the associated battery compartment.

One particular example of such a portable hand-held electrical device is a vibratory massaging device which, in accordance with the treatment/relaxation/stimulation being offered, may be required to be used when the user/patient is at least partially immersed in water such as in a bath or perhaps when the user/patient has a water stream, such as that provided by a shower, and in particular a power-shower, directed onto their body.

Known battery compartments are disadvantageously limited in that the environmental conditions within which they can be used are restricted particularly to such situations where there is no danger of water entering the battery compartment. The ingress of water into the battery compartment is a particular problem when some form of control means is associated with the compartment for controlling the supply of electrical power to the associated electrical device and therefore controlling the action required of the electrical device.

SUMMARY OF THE INVENTION

The present invention therefore seeks to provide a battery compartment having advantages over such known compartments and, in particular, a compartment which allows for the ready control of the associated electrical device whilst maintaining a level of water-proofing that allows for use of the device/compartment in situations where water may also be applied to the user/patient.

According to the present invention there is provided a battery compartment associated with a battery-powered electrical device, the compartment including control means for varying the electrical power delivered to the device and the control means comprising a rotatable member, wherein there is provided a water-proofing washer member located within the control means and between the rotatable member and a battery contact member.

The invention is advantageous in that a battery compartment can be provided through which the operation of its associated electrical device can be controlled whilst the aforementioned washer member serves to achieve the required level of water-proofing.

The present invention can therefore readily be used in association with an electrical device to be used by a user/patient while bathing or under water.

Preferably the control means comprises a rotatable housing portion of the compartment and, in particular, a rotatable end-cap of the compartment. The aforementioned end-cap is advantageously arranged to drive the rotatable member.

The rotatable member is advantageously associated with a potentiometer for varying the electrical output from the compartment.

The control means further comprises an electrical contact plate which advantageously forms part of the aforementioned potentiometer.

Indeed, the contact plate can advantageously comprise the aforementioned battery contact member such that the washer member is then arranged to contact the contact plate.

The battery contact member may also include, or comprise, a resilient member which may, in one embodiment of the present invention, be contacted by the contact plate. The resilient member advantageously comprises a spring member such as a helical compression spring.

A particularly compact construction is provided if the rotatable member is in the form of a disk member and the washer member can then advantageously be located within the aforementioned contact plates and between the rotatable member and the disk member.

The washer member is advantageously deformable and, in particular, resiliently deformable. Also, the washer is preferably formed from a non-conductive material and one particularly advantageous form of washer member comprises a rubber washer member.

It will be appreciated that the compartment can be of any appropriate shape or size and can be located integrally with the associated electrical device or remote therefrom.

According to one particular advantageously embodiment, the compartment comprises an elongate compartment and is preferably arranged to receive a plurality of batteries in series therein.

In such an embodiment, the control means advantageously comprises at least a rotatable portion of an end-cap of the elongate compartment which can advantageously be in the form of a cylindrical member.

In such a manner, the control means, and the various elements thereof, is arranged to be in a circular or annular form having a central axis which corresponds to the central longitudinal axis of the elongate compartment.

According to a further advantage, the compartment is provided, at an outer region thereof, with an O-ring member. The O-ring member is advantageously formed of rubber and advantageously located between a formation on the outer surface of the battery compartment and an end-cap member which is preferably associated with the control means.

In particular, the formation on the outer surface of the compartment comprises an annular flange or shoulder.

The electrical device associated with the compartment of the present invention can usefully be in the form of a motor-driven device such as a vibratory/massage device. The device is then arranged to receive power from the batteries within the compartment by way of connector wires and under control of the control means.

It should therefore be appreciated that the present invention is particularly advantageous in achieving the required water-proofing for the battery compartment and, in a principal embodiment of the present invention, this is achieved by the appropriate location of the aforementioned washer member and O-ring member at their respective positions in association with the cap and control means of the compartment.

BRIEF OF THE INVENTION

The invention is described further hereinafter, by way of example only, with reference to the accompanying drawings in which:

FIG. 1A is a side elevational view of a battery compartment embodying the present invention;

FIG. 1B is a plan view of the battery compartment of FIG. 1A;

FIG. 1C is a plan view from below of the battery compartment of FIG. 1A; and

DESCRIPTION OF THE PREFERRED EMBODIMENT

Figure 2:
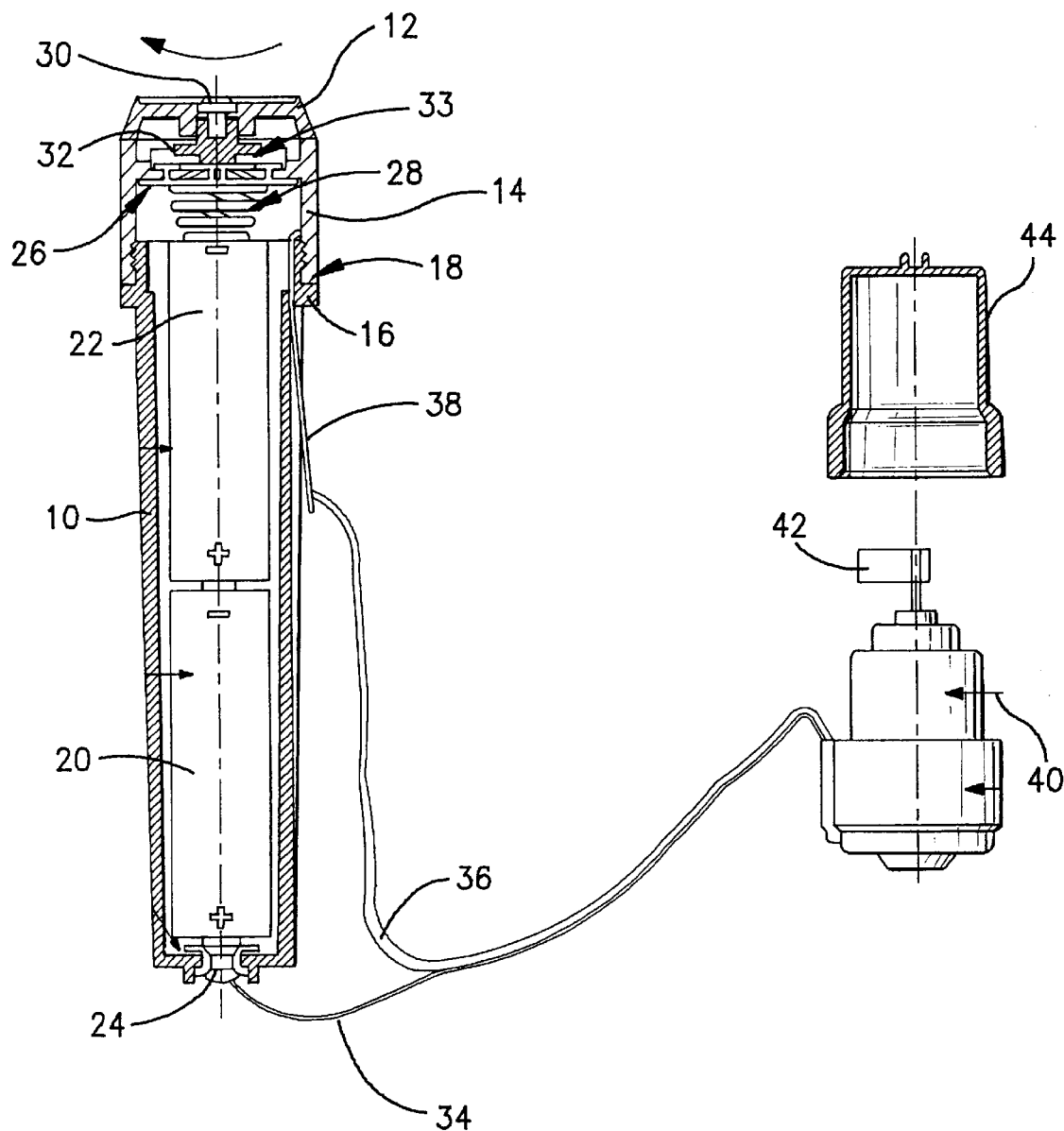
FIG. 2 is a cross-sectional view of the battery compartment of FIG. 1A taken along the line II—II and also shown in association with a vibratory electrical device.

Referring first to FIG. 1A, there is shown a side elevational view of a battery compartment 10 according to one embodiment of the present invention. The battery compartment 10 is in the form of an elongate cylindrical compartment which is closed at one end and, at the other end, includes a circular rotatable control member 12 by which the electrical power delivered from the compartment 10 can be varied. The outer annular surface 14 of the circular control member 12 is provided with a series of serrations 12a so as to assist the user's grip on the control member 12.

The rotatable control member 12 forms part of a closure cap 14 for the compartment 10 which closes onto the compartment 10 adjacent an annular collar 16 of the compartment 10. However, sandwiched between the closure cap 14 and the collar 16 there is provided a rubber O-ring 18 which serves to further enhance the water-proofing achieved by the present invention.

FIGS. 1B and 1C show respective end views of the cylindrical compartment 10, 14 of FIG. 1A.

Turning now to FIG. 2, there is shown a longitudinal cross-section of the cylindrical compartment 10 of FIG. 1A and which is taken along the line A—A of FIG. 1A.

The cross-sectional view of FIG. 2 clearly shows the position of two batteries 20, 22 within the cylindrical compartment 10 and which are arranged to be connected in a series manner. The batteries preferably comprise two UM3, or AA, size batteries as indicated in FIG. 2.

The closed end of the battery compartment 10 includes a contact plate 24 for making contact to the positive stud of the battery 20.

A further contact plate 26 is provided within the closure cap 14/control member 12 arrangement and which is arranged to make contact to the flat end surface of the second battery 22. As will be appreciated from the drawing, the second contact plate 26 makes electrical contact with the flat end surface of the battery 22 via means of a helical compression spring 28 which not only serves to maintain the required electrical connection but also serves to maintain the batteries 20, 22 in a stable manner within the compartment 10.

The rotatable control member 12 is mounted to the closure cap 14 by means of a mounting screw 30 and the control means located within the closure cap 14 and associated with the rotatable control member 12 advantageously includes a rotatable disk 32 which forms part of a potentiometer arrangement serving to control the electrical supply to the electrical device associated with the compartment 10.

An important aspect of the present invention is the location of a rubber washer 33 which, in the illustrated embodiment is located within the closure cap 14 and adjacent various elements associated with the rotatable control member 12.

The rubber washer is advantageously located in contact with the electrical contact plate 26 within the closure cap 14 and further, is located between the rotational disk 32 and the contact spring 28 of the control arrangement.

The ingress of water from a location beneath the rotatable member 12 and further into the closure cap 14 is therefore advantageously prevented by the rubber washer 33 which advantageously forms a snug-fit within the region of its location and prevents the ingress of water to the contact plate 26 and contact spring 28.

The potential ingress of water from the lower end 18 of the closure cap 14 is advantageously prevented by the rubber O-ring 18.

The electrical supply is delivered from the battery compartment by means of a first 34 and second 36 connector wire wherein the first connector wire 34 is connected to the contact plate 24 at the closed end of the compartment 10 and the second connector wire 36 is connected to a copper connector 38 which is in electrical connection with the conductive elements of the control arrangement mounted within the closure cap 14 and associated with the rotatable control member 12.

In the illustrated embodiment, it will be appreciated that the electrical device associated with the compartment 10 comprises a vibratory motor 40 having an off-centre mounted weight 42 mounted to the motor thereof and which devices are enclosed by means of a housing cap 44 shown in cross-section in FIG. 2.

The electrical device 40, 42, 44 can advantageously be associated with a vibratory massage device which, as part of its use, may advantageously be employed in a wet environment where the danger of water ingress into the associated battery compartment 10 is an important concern.

The embodiment of the present invention as illustrated in the drawings is particularly advantageous in that, through the respective positioning of the rubber washer 33 and the rubber O-ring 18, the required water-proofing for the compartment and associated control means can readily be achieved while not impairing the accurate and easy control of the electrical device.

As mentioned, this particular advantage is achieved through the respective location of the rubber washer and the rubber O-ring and, in particular, where the rubber washer is located inside the contact plates associated with the control means and between the rotational disk and contact spring thereof, and wherein the rubber O-ring is located between the battery compartment and the closure cap.

It should of course be appreciated that the present invention is not restricted to the details of the foregoing embodiments. For example, the battery compartment can be provided in any particular form and indeed the control member to be gripped and moved by the operator can also be provided in any particular format. Also, the control arrangements within the closure cap and associated with the moveable control member can be provided in any appropriate format and the electrical device to be powered by way of the batteries located within the compartment can comprise any appropriate electrical device.

I claim:

1. A battery compartment associated with a battery-powered electrical device, the compartment including control means for varying the electrical power delivered to the device and the control means comprising a rotatable member, wherein there is provided a water-proofing washer member located within the control means and between the rotatable member and a battery contact member.

2. A compartment as claimed in claim 1, wherein the control means comprises a rotatable housing portion of the compartment.

3. A compartment as claimed in claim 1, wherein the control means comprises a rotatable end-cap of the compartment.

4. A compartment as claimed in claim 1, wherein the end-cap is arranged to drive the rotatable member.

5. A compartment as claimed in claim 1, wherein the rotatable member is associated with a potentiometer for varying the electrical output from the compartment.

6. A compartment as claimed in claim 1, wherein the control means further comprises an electrical contact plate forming part of the aforementioned potentiometer.

7. A compartment as claimed in claim 6, wherein the contact plate comprises the battery contact member such that the washer member is then arranged to contact the contact plate.

8. A compartment as claimed in claim 1, wherein the battery contact member comprises a resilient member.

9. A compartment as claimed in claim 8, wherein the resilient member comprises a spring member.

10. A compartment as claimed in claim 6, wherein the rotatable member comprises a disk member and the washer member is located within the contact plates and between the rotatable member and the disk member.

11. A compartment as claimed in claim 1, wherein the washer member is deformable.

12. A compartment as claimed in claim 1, wherein the washer member is formed from an electrically non-conductive material.

13. A compartment as claimed in claim 1, and comprising an elongate compartment arranged to receive a plurality of batteries in series.

14. A compartment as claimed in claim 13, wherein the control means comprises at least a rotatable portion of an end-cap of the elongate compartment itself in the form of a cylindrical member.

15. A compartment as claimed in claim 13, wherein elements of the control means are arranged to be in a circular or annular form having a central axis which corresponds to the central longitudinal axis of the elongate compartment.

16. A compartment as claimed in claim 13, and including an o-ring member located between a formation on the outer surface of the battery compartment and an end-cap member associated with the control means.

17. A compartment as claimed in claim 16, wherein the said formation on the outer surface of the compartment comprises an annular flange or shoulder.

* * * * *